United States Patent
Krause (10) Patent No.: US 8,503,208 B2
(45) Date of Patent: Aug. 6, 2013

(54) CONVERTER FOR SINGLE-PHASE AND THREE-PHASE OPERATION, D.C. VOLTAGE SUPPLY AND BATTERY CHARGER

(75) Inventor: Axel Krause, Nesslau (CH)

(73) Assignee: BRUSA Elektronik AG, Sennwald (CH)

(*) Notice: Subject to any disclaimer, the term of this patent is extended or adjusted under 35 U.S.C. 154(b) by 240 days.

(21) Appl. No.: 13/131,874

(22) PCT Filed: Jan. 26, 2010

(86) PCT No.: PCT/IB2010/050333
§ 371 (c)(1),
(2), (4) Date: Jun. 28, 2011

(87) PCT Pub. No.: WO2010/086788
PCT Pub. Date: Aug. 5, 2010

(65) Prior Publication Data
US 2011/0261591 A1 Oct. 27, 2011

Related U.S. Application Data

(60) Provisional application No. 61/148,377, filed on Jan. 29, 2009, provisional application No. 61/228,141, filed on Jul. 23, 2009.

(30) Foreign Application Priority Data

Jan. 29, 2009 (CH) .................................. 0136/09
Jul. 8, 2009 (CH) .................................. 1059/09

(51) Int. Cl.
*H02M 7/219* (2006.01)
(52) U.S. Cl.
USPC .......................................... 363/127

(58) Field of Classification Search
USPC ................. 363/84, 89, 95, 98, 125, 127, 131, 363/132; 323/910
See application file for complete search history.

(56) References Cited

U.S. PATENT DOCUMENTS

| 3,517,300 A | 6/1970 | McMurray |
| 4,017,784 A | 4/1977 | Simmons et al. |

(Continued)

FOREIGN PATENT DOCUMENTS

| CA | 1106915 B | 8/1981 |
| DE | 1638344 A1 | 9/1969 |

(Continued)

OTHER PUBLICATIONS

ISR of Swiss(CH) Patent Office in Priority Application No. CH1059/2009, dated Nov. 3, 2009.

(Continued)

*Primary Examiner* — Gary L Laxton
(74) *Attorney, Agent, or Firm* — George Kapsalas; Patentbuero Paul Rosenich AG (57) ABSTRACT

A Converter (1a.1c) for single-phase and three-phase Operation which comprises a three-phase rectifier to which three coils ($L_a$, $L_b$, $L_c$) are connected on the mains side is described. A first coil ($L_a$) is provided on the mains side with a switch (S) which connects the first coil ($L_a$) to the mains during three-phase Operation and connects it via a capacitor (C) either to the lower end (FP) of the rectifier or on the mains side to another coil ($L_b$, $L_c$) during single-phase Operation. In addition, a d.c. voltage supply and a battery charger (5a.5c) which comprise the Converter (1a.1c) according to the invention are described.

20 Claims, 9 Drawing Sheets

U.S. PATENT DOCUMENTS

| | | | |
|---|---|---|---|
| 4,152,636 A | 5/1979 | Gorden | |
| 4,336,486 A | 6/1982 | Gorden et al. | |
| 4,591,775 A | 5/1986 | Nussel et al. | |
| 4,685,039 A | 8/1987 | Inou et al. | |
| 5,200,887 A | 4/1993 | Ioroi et al. | |
| 5,555,494 A | 9/1996 | Morris | |
| 5,633,577 A | 5/1997 | Matsumae et al. | |
| 5,650,923 A | 7/1997 | Suzuki et al. | |
| 5,710,698 A * | 1/1998 | Lai et al. | 363/56.05 |
| 5,754,413 A | 5/1998 | Fraidlin et al. | |
| 5,872,707 A * | 2/1999 | Asplund | 363/51 |
| 5,949,662 A | 9/1999 | Boldin et al. | |
| 5,973,939 A | 10/1999 | Tan | |
| 6,337,801 B2 * | 1/2002 | Li et al. | 363/127 |
| 6,388,904 B2 | 5/2002 | Nomura | |
| 6,490,183 B2 | 12/2002 | Zhang | |
| 6,765,810 B2 | 7/2004 | Perry | |
| 7,149,096 B2 | 12/2006 | Batarseh et al. | |
| 7,187,566 B2 | 3/2007 | Kawashima et al. | |
| 7,498,776 B2 | 3/2009 | Nishimura | |
| 7,593,244 B2 | 9/2009 | Sodo et al. | |
| 7,679,941 B2 | 3/2010 | Raju et al. | |
| 7,746,669 B2 | 6/2010 | Falk | |
| 7,944,723 B2 * | 5/2011 | Crane | 363/127 |
| 8,009,443 B2 * | 8/2011 | Krause | 363/17 |
| 2002/0126517 A1 | 9/2002 | Matsukawa et al. | |
| 2003/0133317 A1 * | 7/2003 | Norrga | 363/127 |
| 2005/0083716 A1 * | 4/2005 | Marquardt | 363/132 |
| 2008/0284386 A1 | 11/2008 | Nishimura | |
| 2008/0316774 A1 | 12/2008 | Ito et al. | |
| 2010/0220501 A1 | 9/2010 | Krause | |

FOREIGN PATENT DOCUMENTS

| | | | |
|---|---|---|---|
| DE | 1763299 A1 | 10/1971 | |
| DE | 2127497 A1 | 12/1972 | |
| DE | 2624532 A1 | 12/1977 | |
| DE | 2737541 A1 | 2/1978 | |
| DE | 4416679 A1 | 12/1994 | |
| DE | 19646666 A1 | 6/1997 | |
| DE | 19941170 A1 | 3/2001 | |
| DE | 10051156 A1 | 5/2002 | |
| DE | 10151153 A1 | 4/2003 | |
| DE | 102006055126 A1 | 6/2008 | |
| EP | 0116925 A2 | 8/1984 | |
| EP | 0152719 A1 | 8/1985 | |
| EP | 0670236 A1 | 9/1995 | |
| EP | 1227571 A2 | 7/2002 | |
| EP | 1391982 A2 | 8/2003 | |
| EP | 1643626 A2 | 4/2006 | |
| EP | 1926205 A1 | 5/2008 | |
| EP | 1971016 A2 | 9/2008 | |
| JP | 2002-223565 A | 8/2002 | |
| JP | 03111413 A | 4/2003 | |
| JP | 2005006455 A | 1/2005 | |
| WO | 86/04749 A1 | 8/1986 | |
| WO | 93/20614 A1 | 10/1993 | |
| WO | 2006125410 A1 | 11/2006 | |
| WO | 2010086823 A2 | 8/2010 | |
| WO | 2010086788 A3 | 10/2010 | |
| WO | 2010086823 A3 | 10/2010 | |
| WO | 2010150139 A1 | 12/2010 | |

OTHER PUBLICATIONS

ISR of Swiss(CH) Patent Office in Priority Application No. CH0136/2009, dated Apr. 20, 2009.

PCT International Search Report and Written Opinion from WO2010086823 claiming same Swiss priority application as the present application; dated Aug. 27, 2010. (partial translation from WIPO).

PCT International Search Report and Written Opinion from WO2010086788 parent application of the present application; dated Aug. 17, 2010.

Pinheiro, J.R. et al. "Isolated Interleaved-Phase-Shift PWM DC-DC ZVS Converters," from IEEE 2000 Industry Applications Conference, Oct. 8-12, 2000, Piscataway NJ, pp. 2383-2388; ISBN: 978-0-7803-6401-1; cited in PCT ISR of parent application.

Steigerwald, R.L. et al. "A Comparison of High Power DC-to-DC Soft-Switched Converter Topologies," from IEEE 1994 Annual Conference of the Industry Applications Society, Oct. 2-6, 1994, Denver, Colorado, pp. 1090-1096; ISBN:978-0-7803-1993-6; cited in PCT ISR of parent application.

* cited by examiner

CONVERTER FOR SINGLE-PHASE AND THREE-PHASE OPERATION, D.C. VOLTAGE SUPPLY AND BATTERY CHARGER

This application is a 35 U.S.C. 371 national-phase entry of PCT International application no. PCT/IB2010/050333 filed on Jan. 26, 2010 and claims benefit of foreign priority to Swiss national application no. CH-00136/2009 filed on Jan. 29, 2009 and to Swiss national application no. CH-01059/2009 filed on Jul. 8, 2009; and also claims priority as a non-provisional of U.S. provisional application Ser. No. 61/148,377 filed on Jan. 29, 2009 and priority as a non-provisional of U.S. provisional application Ser. No. 61/228,141 filed on Jul. 23, 2009; both Swiss national application no. CH-00136/2009 and U.S. provisional application Ser. No. 61/148,377 are incorporated herein by reference in their entirety for all intents and purposes, as if fully set forth identically herein.

The invention relates to a converter for single-phase and three-phase operation, comprising three branches connected in parallel and each having two rectifying elements connected in series, the direction of flow of the rectifying elements pointing away from a low end, and three mains-side coils which are connected between the two rectifying elements of one branch each.

Modern semiconductor technology has permitted converters from a.c. voltage to d.c. voltage and vice versa for comparatively high powers. The feedbacks into the supply network are problematic. Such feedbacks can occur, for example, in the case of transient processes which are due, for example, to switching processes or nonlinear consumers, in particular due to components of the power electronics, such as, for example, transistors and thyristors.

Inverters are used, for example, wherever a d.c. voltage is to be converted into a a.c. voltage, for example if solar direct current is to be fed into the a.c. voltage mains. Rectifiers on the other hand are used when an apparatus (for example an electronic circuit) is to be connected to the alternating current mains but is suitable only for d.c. voltage. A further field of use is the charging of batteries or accumulators, which is becoming increasingly important owing to the steadily growing mobility of people and the associated operation of mobile electrical and electronic devices. Not least, electrically powered motor vehicles set completely new requirements with regard to battery chargers, since charging should be possible both on the single-phase mains (customary in the household) and on the three-phase mains—owing to the greater power density and hence faster charging. Furthermore, a comparatively high energy content (which in the end determines the range of the vehicle) should be transferred in as short a time as possible from the mains into the battery. The high power of such battery chargers which is required for this purpose and unfortunately frequently leads, with conventional devices, to comparatively high mains feedbacks which are reduced according to the prior art, for example, with the aid of suitable filters (e.g. absorption circuit, low-pass filter, etc). However, power ripples at the load (e.g. battery) can also cause problems.

For example, DE 10151153A1 describes in this context an apparatus for charging batteries for electric vehicles which has a controlled step-up transformer for producing a d.c. voltage from a single-phase or multiphase a.c. voltage which is lower than the d.c. voltage. The charger is equipped with a mains filter and a particular series choke which keep the mains feedbacks low.

Furthermore, DE000002624532A1 discloses the capacitor exclusively on the single-phase mains only in association with resistances and diodes, not with one or more coils and also not optionally on the three-phase mains. DE10151153A1 discloses a converter with uncoupled chokes at the mains input, followed by a non-resonant PWM inverter. No capacitor switching is mentioned. EP1643626A2 discloses switchable capacitors in combination with chokes and a passive three-phase rectifier, but these capacitors are not connected on the mains side but on the "switch side" of the chokes (in the case of the diodes). EP1971016A2 discloses a coupled (filter) choke together with a capacitor as a passive three-phase harmonic filter. However, the capacitor is not switchable and the mains-side converter is a passive rectifier. Single-phase operation is not intended, and the chokes are on the DC side of the rectifier. U.S. Pat. No. 5,200,887 discloses switchable (DC) capacitors parallel to the passive rectifiers in order nevertheless to achieve the same intermediate circuit voltage (as in the case of 400 V) on halving the mains voltage (from 400 to 200 V). No chokes are present.

It is now an object of the invention to provide a converter, a d.c. voltage supply having such a converter and a battery charger having such a d.c. voltage supply for single-phase and three-phase operation, in which the mains feedbacks are further reduced and/or power ripples are kept away from the load in the case of single-phase operation.

This object is achieved by the invention.

Accordingly, a converter according to the invention for single-phase and three-phase operation comprises:

three branches connected in parallel and each having two rectifying elements connected in series, the direction of flow of the rectifying elements pointing away from a low end, three mains-side coils which are connected between the two rectifying elements of one branch each, a first coil being provided on the mains side with a switch which connects the first coil to the mains during three-phase operation and connects it via a capacitor,
a) to the low end or
b) on the mains side to another coil during single-phase operation.

Accordingly, in a d.c. voltage supply according to the invention:

a converter according to the invention is connected on the load side to a two-pole inverter, the inverter is connected to a primary side of a transformer and a secondary side of the transformer is connected to a two-pole rectifier and the rectifier is provided for connection of a load.

Accordingly, furthermore, in an alternative d.c. voltage supply according to the invention:

a converter according to the invention is connected on the load side to two two-pole inverters connected in parallel or in series and each having a capacitor connected parallel thereto, the inverters are connected to a primary side of each of two transformers, a secondary side of each of the transformers is connected to in each case a two-pole rectifier having in each case a capacitor connected parallel thereto and the rectifiers are connected in parallel or in series and are provided for connection of a load.

Accordingly, furthermore, in a battery charger according to the invention, one of the two abovementioned converters according to the invention is provided for connection of an accumulator on the load side.

Accordingly, finally, in a battery charger according to the invention, a d.c. voltage supply according to the invention is provided for connection of an accumulator on the load side.

Because of the switch provided on the mains side in the case of the first coil, it is possible to operate the converter both in the single-phase mode and in the three-phase mode without the mains feedbacks becoming excessively large. For this purpose, the first coil or choke is connected to the mains in the case of three-phase operation and connected via a capacitor either to the low end or on the mains side to another coil in the case of single-phase operation. By means of this circuit, the mains feedbacks are effectively reduced—as will be shown later. The converter is therefore also suitable in particular for said d.c. voltage supplies and said battery chargers. However, its use is by no means limited to this area. Owing to the reduced mains feedbacks, it is therefore possible to realize in particular very efficient battery chargers (for example for electric vehicles) which nevertheless fulfill the regulations of the energy supply companies with regard to the maximum mains feedbacks. Finally, power ripples at the load, i.e. for example of a battery, are also effectively reduced.

At this point, it is pointed out that, in the context of the disclosure, a "converter" can be understood as meaning a rectifier, an inverter or a bidirectional converter. Furthermore, a "rectifying element" can be understood, for example, as meaning a diode, a transistor, a thyristor or another rectifying element. Accordingly, there are passive rectifiers, active rectifiers or active inverters. Finally, "batteries" are to be understood as meaning rechargeable batteries, accumulators or other power-storing media.

Advantageous configurations and further developments of the invention are evident from the description in combination with the figures of the drawing.

It is advantageous if the first coil consists of two part-coils which are connected in parallel in the case of three-phase operation and in series in the case of single-phase operation. In this way, a high inductance can be realized for single-phase operation whereas the inductance is comparatively low in the three-phase case. The high inductance results in small current ripples and is preferably used when the capacitor is connected to the low end.

It is particularly advantageous if the coils are coupled in the same sense. The coupling of the coils results in particularly low current ripples. This circuit therefore has a particularly low mains feedback.

It is also advantageous if the part-coils are coupled in the same sense to the other coils in the case of three-phase operation and if, in the case of single-phase operation with the coil divided into two part-coils, one part-coil is coupled in the same sense and the other part-coil in the opposite sense to the other coils. This results in a lower magnetic modulation of the coil core so that it can be designed to be smaller.

It is also advantageous if the part-coils and the other coils have the same number of turns. In this way, the current through the part-coils can be halved relative to the other coils during three-phase operation, and the part-coils connected in parallel act in the same way as the other two coils, which in the case of three-phase operation leads to symmetrical behavior in all three coils.

It is advantageous if one switching element each is connected antiparallel to each rectifying element. The converter can then convert electrical energy not only in one direction but also in the opposite direction and therefore permits in principle bidirectional operation, i.e. conversion of alternating current into direct current and vice versa. Suitable switching elements are, for example, components from power electronics, in particular transistors or thyristors. The abovementioned converters, i.e. passive rectifiers, active rectifiers or active inverters, can therefore also be used in any combination, i.e. for example a passive rectifier combined with an active inverter.

Finally, it is advantageous if, in the case of a d.c. voltage supply according to the invention, a rectifying element is connected antiparallel to one switching element each of an inverter and a switching element is connected antiparallel to one rectifying element each of a rectifier. The d.c. voltage supply can thus also operate as an inverter and thus permits in principle bidirectional operation, i.e. conversion of alternating current into direct current and vice versa. This means that such embodiments can be optimally used, for example, in the solar power sector by virtue of the fact that, in sunlight and with an excess of direct current, the electrical energy firstly can be stored in batteries but secondly can also be delivered to the alternating current mains. If darkness then occurs with a simultaneous demand for alternating current, firstly alternating current can be taken from the mains (if the mains is capable of supply) and secondly current from the batteries can be converted into alternating current and can thus serve the system as an a.c. voltage source. Furthermore, an electric vehicle (not used for driving) can accordingly be operated with its battery as a power buffer for an alternating current mains. Suitable switching elements are, for example, once again components from power electronics, in particular power transistors or thyristors.

At this point, it should be made clear that the invention does not relate to converters for battery chargers but to converters generally. Moreover, the battery chargers do not relate simply to applications in motor vehicle construction but generally to battery chargers. The person skilled in the art will without difficulty find here that the invention is also suitable for other fields of use.

The above configurations and further developments of the invention can be combined in any manner.

The present invention is explained in more detail below with reference to the working examples shown in the schematic figures of the drawing.

In the figures of the drawing, identical and similar parts are provided with the same reference numerals and functionally similar elements and features—unless mentioned otherwise—are provided with the same reference numerals but different indices.

Figure 1:
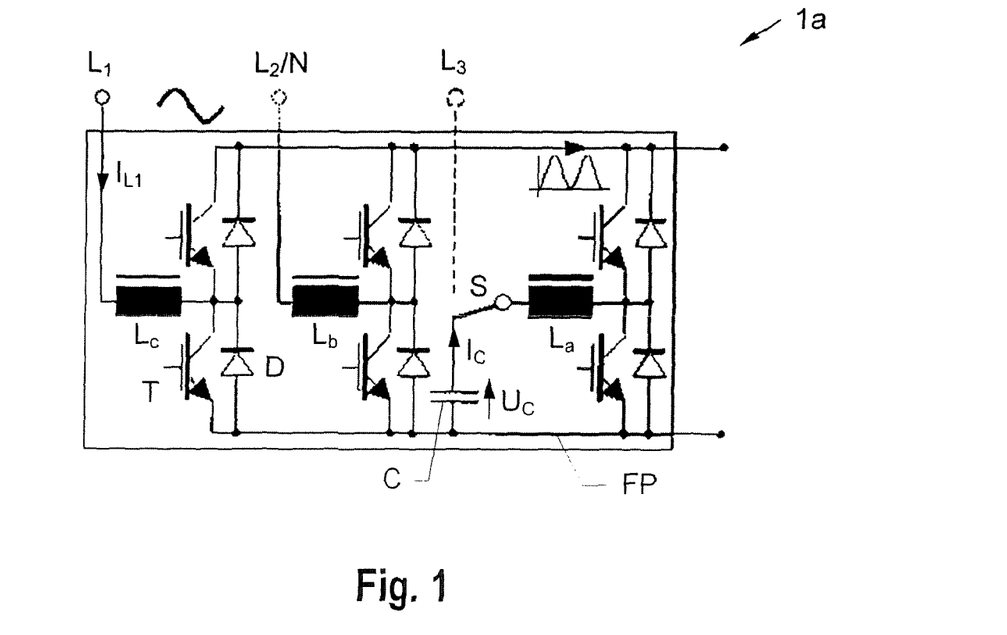
FIG. 1 schematically shows a first variant of a converter according to the invention.

FIG. 1 schematically shows a variant of a converter 1a according to the invention. The converter 1a comprises three branches connected in parallel and each having two rectifying elements connected in series, in this case diodes D, whose direction of flow points away from a low end FP, and three coils $L_a$, $L_b$, $L_c$, which are connected between the two diodes D of one branch each and are connected to one mains connection $L_3$, $L_{2/N}$, $L_1$ each. In the case of a first coil $L_a$, a switch S is provided on the mains side, which switch S connects the first coil $L_a$ to the mains connection $L_3$ in the case of three-phase operation and via a capacitor C to the lower end FP in the case of single-phase operation. In addition, one switching element each, in this case a transistor T, is connected antiparallel to each diode D. This is advantageous for realizing the basic invention and also serves for being able to operate the converter 1 bidirectionally.

Figure 2:
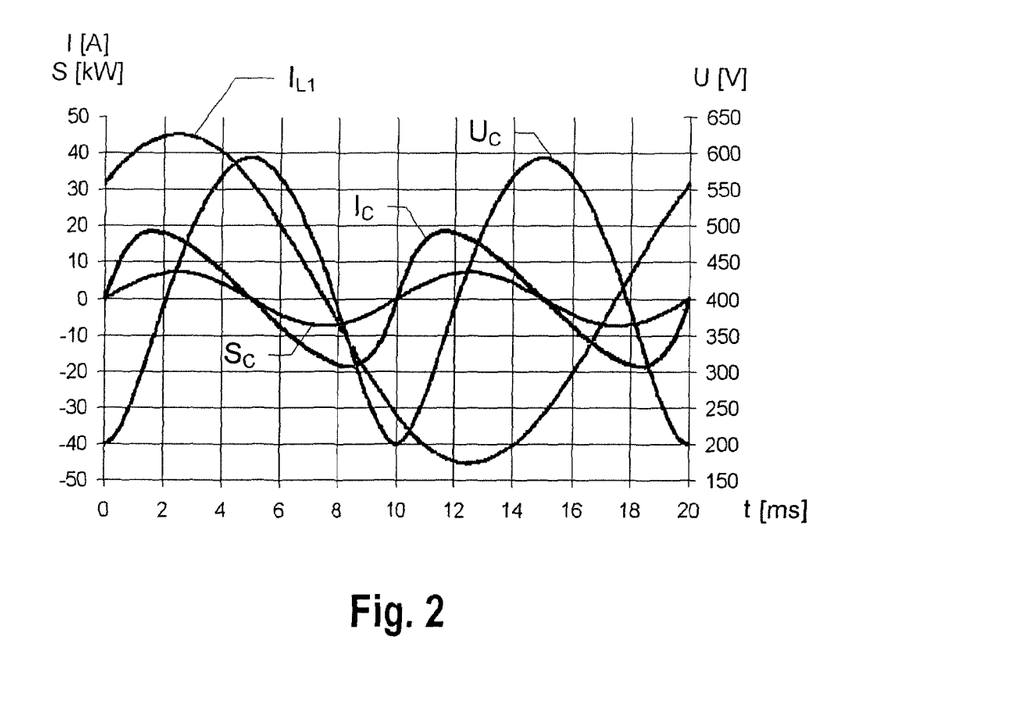
FIG. 2 shows the variation of selected parameters of the first converter as a function of time.

FIG. 2 shows the variation of selected parameters of the converter 1a shown in FIG. 1 as a function of time, namely that of the phase current $I_{L1}$ of the capacitor current $I_C$, of the capacitor voltage $U_C$ and finally of the apparent power at the capacitor $S_C$. The curve is chosen so that a constant power flux occurs at the output of the converter 1a although the converter 1a is operated in single-phase mode at the input and accordingly pulses the power with twice the mains frequency (e.g. 100 Hz) at the input. It is clearly evident that the capacitor current $I_C$, the capacitor voltage $U_C$ and hence the apparent power $S_C$ oscillate twice as fast as the phase current $I_{L1}$. In the diagram shown, the phase current $I_{L1}$ oscillates at 50 Hz and hence the capacitor current $I_C$, the capacitor voltage $U_C$ and the apparent power $S_C$ at 100 Hz.

The lower the minimum capacitor voltage $U_C$, the greater is the maximum capacitor charging current/discharging current $I_C$. Calculations/simulations also show that, for 90% use of the energy stored in the capacitor C at maximum capacitor voltage $U_C$, a minimum capacitor voltage $U_C$ of 31.6% of the highest capacitor voltage $U_C$ is sufficient for completely compensating the power ripple in single-phase operation. In the example shown, the maximum capacitor voltage $U_C$ is 600 V and the minimum capacitor voltage $U_C$ is 190 V (rounded up to 200 V). The capacitance C is 150 μF.

In the converter 1a shown in FIG. 1, a 100 Hz current flows through the first coil $L_a$ while a 50 Hz current flows through the other two coils $L_b$ and $L_c$. There are therefore moments when these currents partly compensate but also those when they sum. Calculations show that, with the use of coupled chokes $L_a$, $L_b$, $L_c$ in the latter case, the common core is strongly driven to saturation. In order to counteract this, the current through the first coil $L_a$ should advantageously also be a 50 Hz alternating current. This can be achieved with the following circuit shown in FIG. 3.

Figure 3:
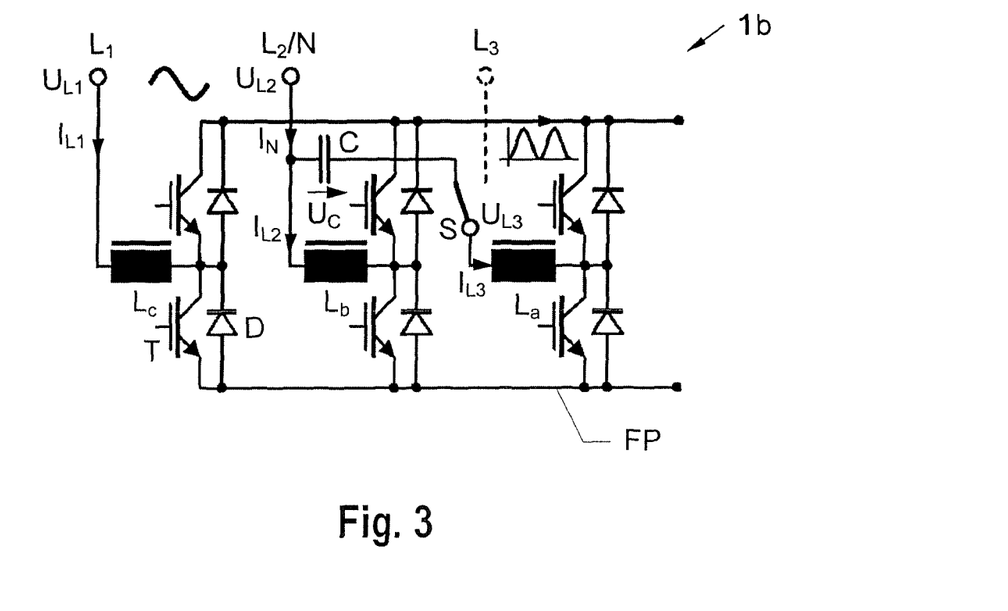
FIG. 3 schematically shows a second variant of a converter according to the invention.

FIG. 3 shows a converter 1b which is very similar to the converter 1a shown in FIG. 1. The switch S connects the first coil $L_a$ in single-phase operation via a capacitor C but not to the low end FP but instead to another coil $L_b$, $L_c$, in the example shown to the second coil $L_b$.

With the aid of the capacitor C, a "third phase" whose current is 45° ahead of the mains current is produced from the second phase or the neutral conductor $L_{2/N}$. This results from the fact that, at the maximum amplitude, a part of the mains current $I_N$ flows into the capacitor C and the capacitor current $I_C$ is zero when the instantaneous value of the mains current $I_N$ falls below its effective value. In the case of sinusoidal mains current $I_N$, this is the case 45° after the maximum.

Figure 4:
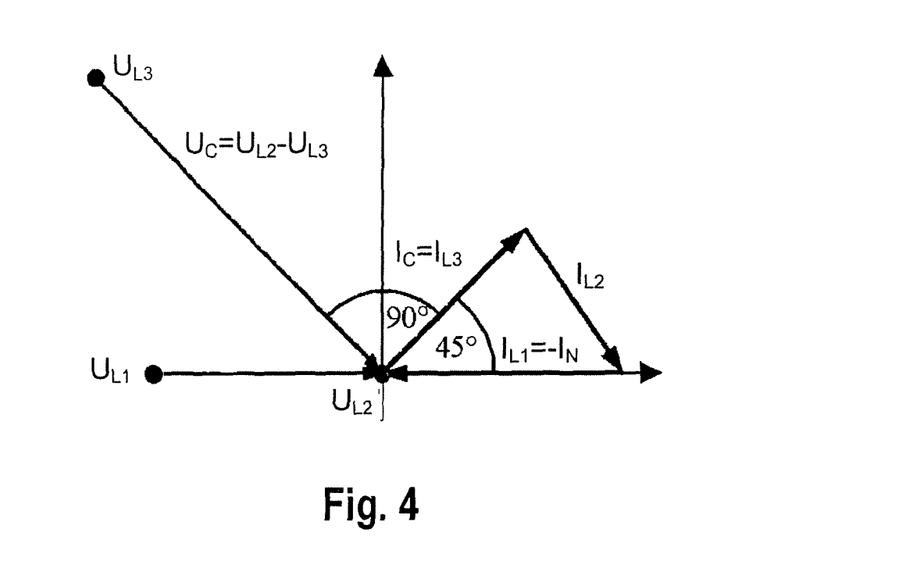
FIG. 4 shows a vector diagram of selected parameters of the second converter.
Figure 5:
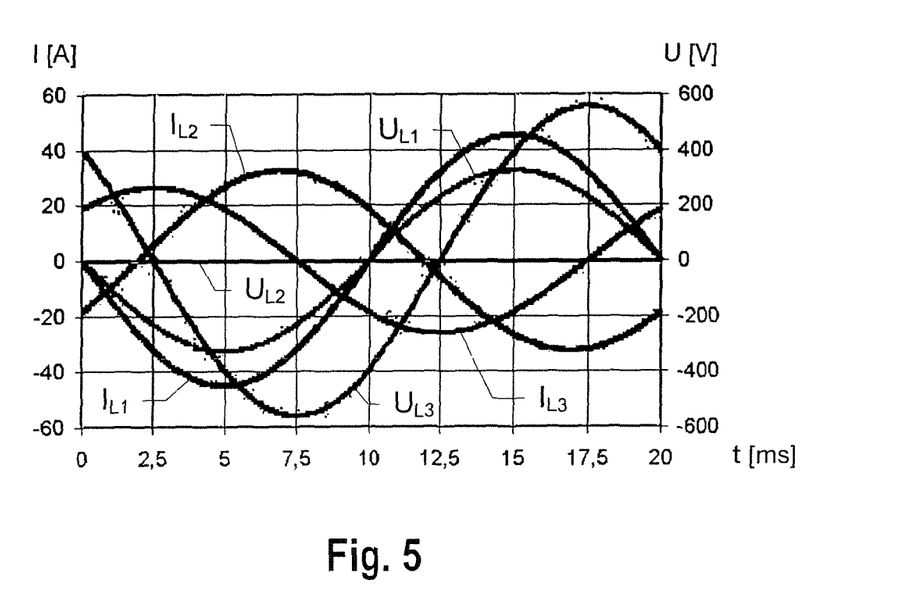
FIG. 5 shows the variation of selected parameters of the second converter as a function of time.

FIG. 4 shows a vector diagram and FIG. 5 the variation of the phase voltages $U_{L1}$, $U_{L2}$ and $U_{L3}$ and of the phase currents $I_{L1}$, $I_{L2}$ and $I_{L3}$ of the converter 1b shown in FIG. 3 as a function of time. Although the third phase $L_3$ is not connected on the mains side, the term is retained owing to the virtually produced third phase.

It is evident from the vector diagram that the capacitor voltage $U_C = U_{L2} - U_{L3}$ lags behind the capacitor current $I_C = I_{L3}$ by 90° (note direction of arrow). For the second phase voltage, $U_{L2} = 0$ owing to the connection to the neutral conductor $L_{2/N}$. In the diagram shown, the capacitor voltage $U_C$ has the greatest magnitude. This is advantageous but not essential. After a rotation of the system through 45°, the capacitor current $I_C$ is maximum but the capacitor voltage $U_C$ is zero, and hence also the power output by the capacitor C. After a rotation through a further 90°, during which the capacitor C picks up power, the capacitor voltage $U_C$ is maximum but the capacitor current $I_C$ is zero, and hence also the power taken up by the capacitor C. At these two operating points described, the instantaneous mains power corresponds to the mains power averaged over a sine period, so that the capacitor C also need not compensate any power.

At peak value of the mains current, the capacitor C reaches $1/\sqrt{2}$ times its maximum voltage $U_{Cmax}$ and also of its maximum current $I_{Cmax}$, owing to the phase shift by 45°. Since at this moment twice the effective power $P_N$ is taken from the mains, and the capacitor C must take up half thereof (i.e. $P_N$), the following is true:

$$P_C = \frac{IC_{max} \cdot UC_{max}}{2} = P_N$$

In the case of sinusoidal current, the following is furthermore true:

$$UC_{max} = IC_{max} \cdot \frac{1}{2\prod fC}$$

in which f is the mains frequency and C the capacitance. Finally, $$UC_{max} = \sqrt{\frac{P_N}{\prod fC}}$$

$$IC_{max} = 2\sqrt{P_N \cdot \prod fC}$$

In the case of the values also chosen for the circuit in FIG. 1, namely C=150 μF, f=50 Hz and $P_N$=7360 W, it is true that $U_{Cmax}$=558.9 V and $I_{Cmax}$=26.34 A. The maximum capacitor voltage $U_{Cmax}$ is thus somewhat lower than in the case of the arrangement shown in FIG. 1 (between 200 V and 600 V there), but the capacitor current $I_C$ is substantially higher. At constant capacitance C, the current $I_C$ also cannot become smaller if the intermediate circuit voltage increases. This disadvantage is, however, compensated by virtue of the fact that the capacitor C substantially reduces the load on the second phase $L_{2/N}$, since in fact the sum of the phase currents $I_{L2}$ and $I_{L3}=I_C$ is equal to the current through the neutral conductor $I_N$. The current in the second phase $I_{L2}$ can be geometrically calculated with the 45° phase angle between mains and capacitor current $I_{L1}$ and $I_C$ (cf. also FIG. 4). According to the cosine law:

$$I_{L2}^2 = I_N^2 + IC^2 - 2I_N IC \cdot \cos(45°)$$

$$I_{L2} = \sqrt{I_N^2 + IC^2 - \sqrt{2} \cdot I_N IC}$$

Below, two specific value combinations for $I_{L2}$ and $I_C$ are to be considered:
a) Capacitor current $I_C$ is equal to the second phase current $I_{L2}$:
The following is true $$IL2 = IC = I_N/\sqrt{2}$$

$$IC \cdot UC = I_N \cdot U_N$$

This results in $$UC = \sqrt{2} \cdot U_N$$

$$UC_{max} = 2 \cdot U_N$$

Example: $I_N=32$ A, $U_N=230$ V, from which it follows that $I_C=I_{L2}=22.63$ A, $U_{Cmax}=460$ V and $$C = \frac{IC}{UC} \cdot \frac{1}{2\Pi f} = \frac{I_N}{2U_N} \cdot \frac{1}{2\Pi f} = 221.4\ \mu F$$

A further consideration shows that, for this case, the peak energy value in the storage chokes is at the peak mains current and assumes the smallest value.
b) The sum of the squares of the current (and hence of the ohmic losses) is minimal:
The following is true $$\frac{d}{dIC}(IL2^2 + IC^2) = \frac{d}{dIC}(I_N^2 + 2IC^2 - \sqrt{2}\ I_N IC) = 4IC - \sqrt{2}\ I_N = 0$$

From this it follows that $$IC^2 = \frac{I_N^2}{8}$$

$$IS^2 = \frac{5I_N^2}{8}$$

and $$UC = 2\sqrt{2} \cdot U_N\ UC_{max} = 4 \cdot U_N$$

For the above example, the following is true:

$$I_C = 11.31\ A, I_S = 25.30\ A, U_{Cmax} = 920\ V.$$

$$C = \frac{IC}{UC} \cdot \frac{1}{2\Pi f} = \frac{I_N}{8U_N} \cdot \frac{1}{2\Pi f} = 55.35\ \mu F$$

The phase angle β between capacitor current $I_C$ and mains current $I_N$ is obtained from $$\sin(\beta) = \frac{\sin(45°)}{\sqrt{5}}$$

i.e. β=18.43°.

Owing to the high required intermediate circuit voltage ($U_{Cmax}=920$ V), the second configuration is impractical. However, consideration shows that the ohmic losses decrease starting from the first configuration "$I_C=I_S$" with decreasing size of capacitor C.

Figure 6:
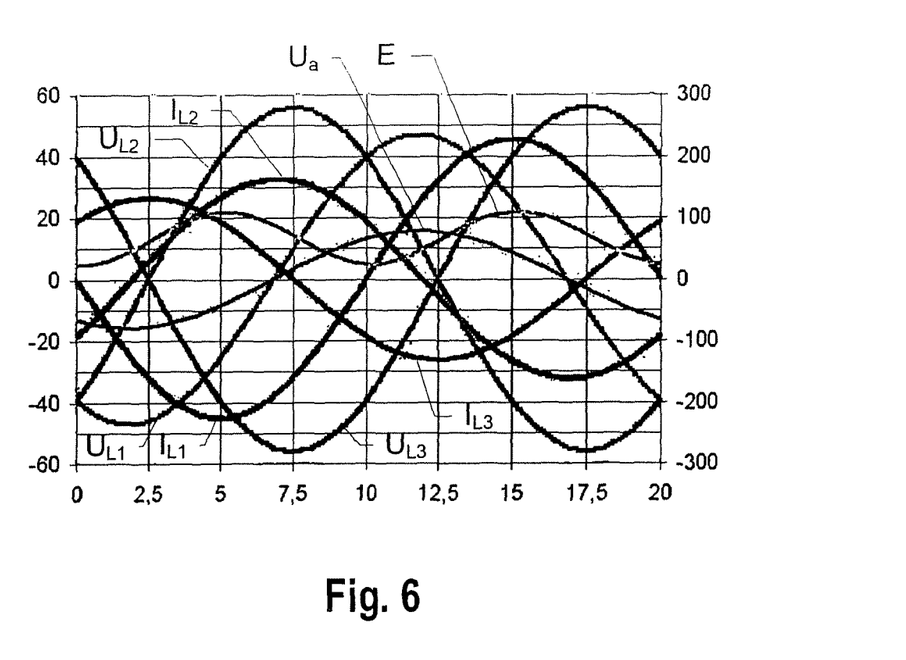
FIG. 6 shows the variation of selected parameters of a further variant of the second converter as a function of time.

In order to realize the mains feedback with as low an intermediate circuit voltage as possible, $U_{L2}$ in a further advantageous variant of the invention is not capped at zero but is modulated, for example, with half the capacitor voltage $U_C$. Consequently, $U_{L2}$ and $U_{L3}$ are always opposite in phase. FIG. 6 shows the corresponding voltage curves. In addition, the average value $U_a$ of all three phase voltages $U_{L1}$, $U_{L2}$ and $U_{L3}$ relative to the intermediate circuit midpoint and the total energy E stored in the chokes $L_a$, $L_b$ and $L_c$ are shown.

Figure 7:
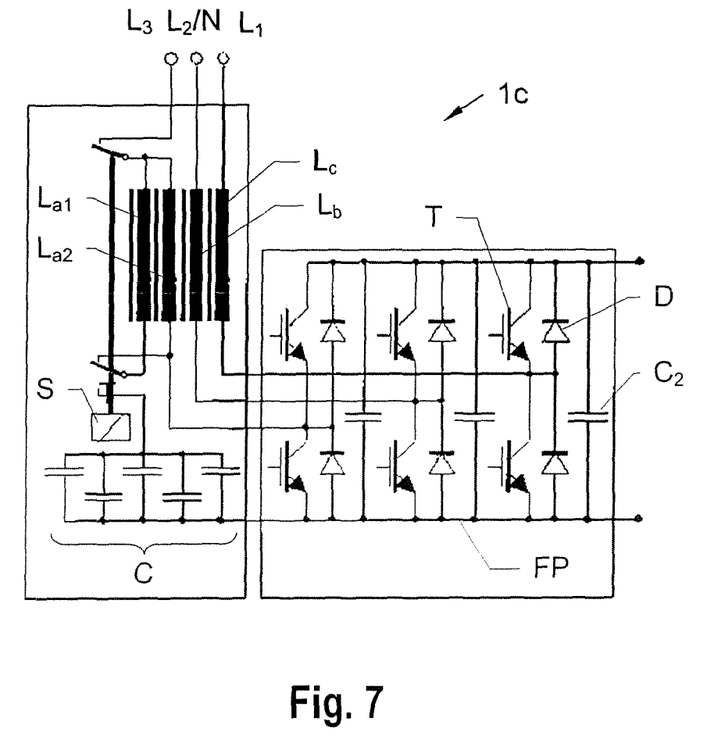
FIG. 7 schematically shows a third variant of a converter according to the invention.

FIG. 7 shows a further advantageous configuration of the invention, namely a converter 1c having three branches connected in parallel and each having two diodes which are connected in series and whose direction of flow points away from a low end FP. One transistor T each is connected antiparallel to each diode D and one capacitor $C_2$ each is connected parallel to each branch. In addition, the circuit comprises three mains-side coils $L_a$, $L_b$, $L_c$, which are connected between the two diodes D of one branch each, the first coil $L_a$ consisting of two part-coils $L_{a1}$, $L_{a2}$, which are connected in parallel in the case of three-phase operation and in series in the case of single-phase operation. In addition, the coils $L_{a1}$, $L_{a2}$, $L_b$, $L_c$ are coupled in the same sense. In the case of the first coil $L_a$, a switch S is provided on the mains side and connects the first coil $L_a$ to the mains in the case of three-phase operation (parallel connection of the part-coils $L_{a1}$ and $L_{a2}$) and connects it via a capacitor C to the lower end FP in the case of single-phase operation (series connection of the part-coils $L_{a1}$ and $L_{a2}$). In this case, the switch S consists of a two-pole relay which appropriately switches the part-coils $L_{a1}$ and $L_{a2}$. The capacitor C is formed from 5 parallel part-capacitors.

Figure 8:
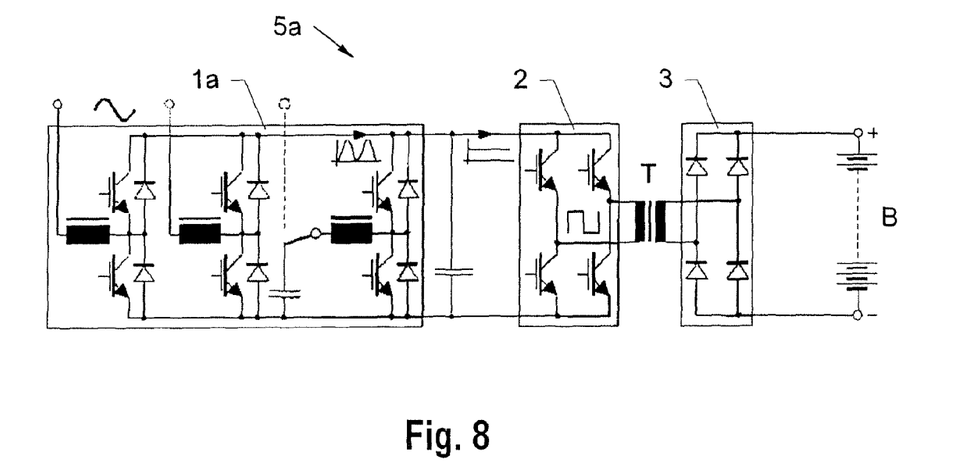
FIG. 8 schematically shows a first variant of a battery charger according to the invention.

FIG. 8 shows a further variant of the invention, namely a battery charger 5a in which the converter 1a from FIG. 1 is connected on the load side to a two-pole inverter 2. The inverter 2 is connected to a primary side of a transformer T, and a secondary side of the transformer T is connected to a two-pole rectifier 3. Finally, a load in the form of a battery B is connected to the rectifier 3. The combination of inverter 2, transformer T and rectifier 3 forms a DC/DC converter which can set the charging voltage to any level.

Figure 9:
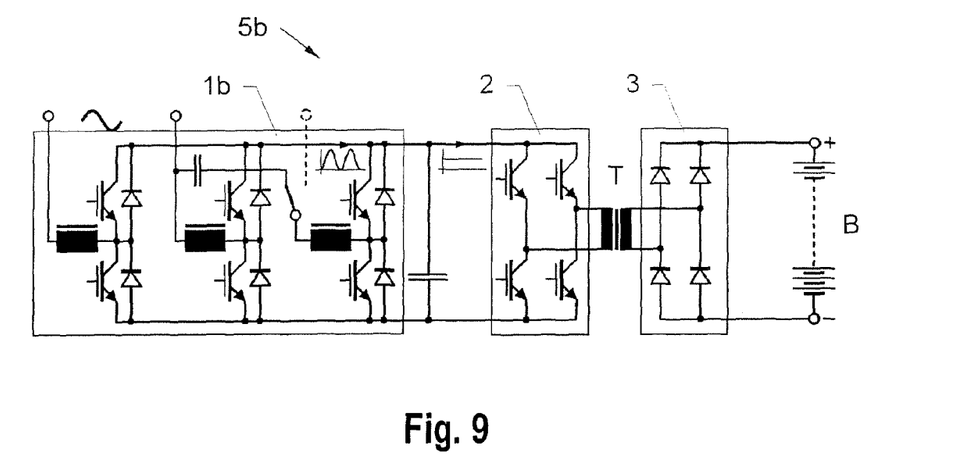
FIG. 9 schematically shows a second variant of a battery charger according to the invention.

FIG. 9 shows a battery charger 5b which in principle has the same design as the battery charger 5b shown in FIG. 8, except that here, instead of the converter 1a from FIG. 1, the converter 1b from FIG. 3 is connected to the inverter 2.

Figure 10:
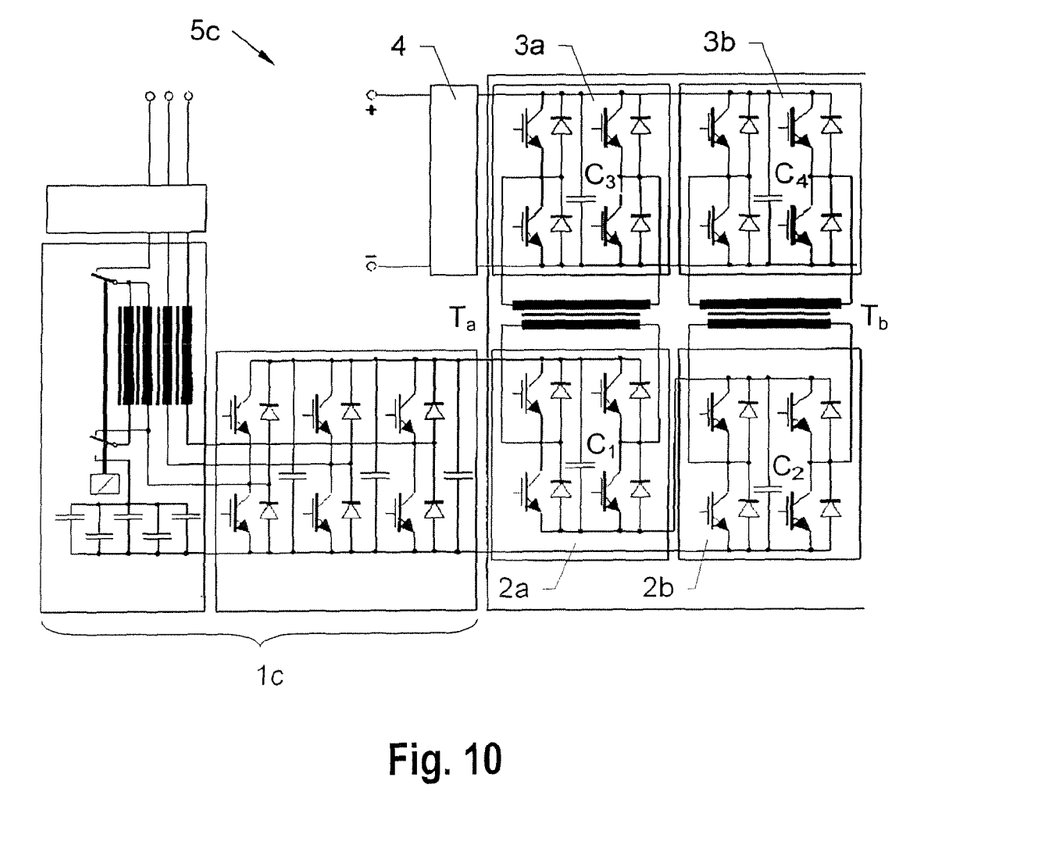
FIG. 10 schematically shows a third variant of a battery charger according to the invention comprising a down-circuit DC/DC converter.

Finally, FIG. 10 shows a battery charger 5c in which the converter 1c from FIG. 7 is connected on the load side to two two-pole inverters 2a, 2b connected in series and each having a capacitor $C_1$, $C_2$ connected parallel thereto. The inverters 2a, 2b are in turn connected to one primary side each of two transformers $T_a$, $T_b$. One secondary side each of the transformers $T_a$, $T_b$ is connected to one two-pole rectifier 3a, 3b each and to in each case a capacitor $C_3$, $C_4$ connected parallel thereto. The rectifiers 3a, 3b are in turn connected in parallel and intended for connection of a load via a filter 4. The circuit connected to the converter 1c forms a DC/DC converter which can set the charging voltage for the battery or, in the case of inverse operation, the intermediate circuit voltage to any level.

In the drawing, the inverters 2a, 2b are connected in series on the primary side whereas the rectifiers 3a, 3b are connected in parallel. However, all four combinations of series and parallel connection are conceivable, i.e. for example two parallel inverters 2a, 2b and two parallel rectifiers 3a, 3b.

The function of the DC/DC converter connected in FIG. 10 to the converter 1c is explained with reference to FIG. 11, which shows a simplified diagram of this circuit. In order also to show in principle the bidirectional mode of operation which is possible with the DC/DC converter shown, the energy flow in FIG. 11 is from the battery (not shown in FIG. 10 and connected to the filter 4) to the alternating current mains.

Figure 11:
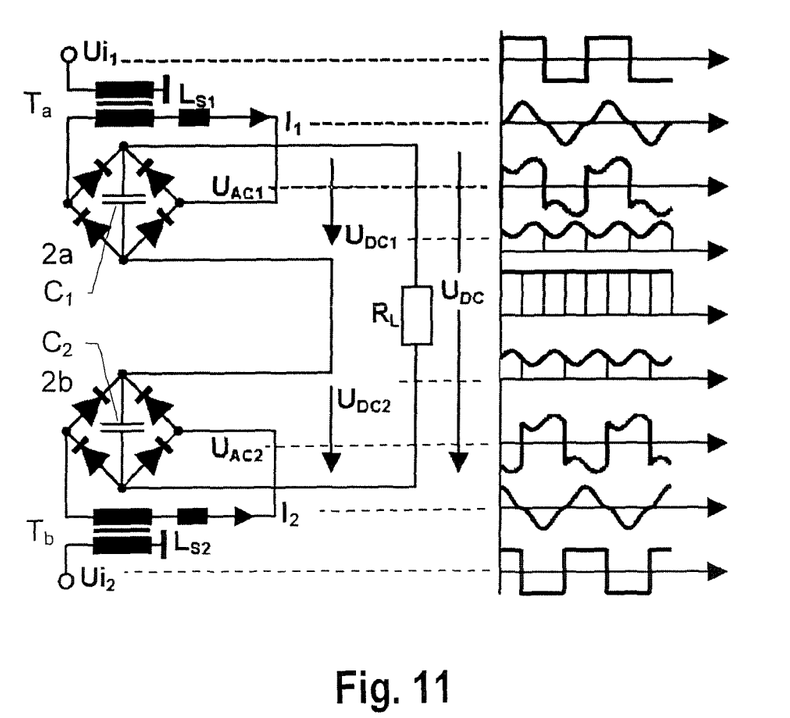
FIG. 11 shows a simplified diagram of the DC/DC converter together with the variation of different voltages and currents as a function of time.

FIG. 11 shows the two transformers $T_a$ and $T_b$, the voltages $U_{i1}$ and $U_{i2}$ which are supplied by the inverters 3a and 3b on the battery side to the transformers $T_a$ and $T_b$, and the load-side or mains-side rectifiers 2a and 2b, which are connected on the secondary side to the transformers $T_a$ and $T_b$ and are shown here as simple full-wave bridge rectifiers with the smoothing capacitors $C_1$ and $C_2$. In addition, the variations of the voltages $U_{i1}$ and $U_{i2}$ of the battery-side inverters 3a and 3b as a function of time, the currents $I_1$ and $I_2$ through the secondary windings of the transformers $T_a$ and $T_b$ and the voltages $U_{AC1}$ and $U_{AC2}$ at the secondary windings of the transformers $T_a$ and $T_b$, the rectified voltages $U_{DC1}$ and $U_{DC2}$ and the summation voltage $U_{DC}$ thereof are shown in FIG. 11.

The two inverters 3a, 3b are operated synchronously with respect to frequency but offset by 90° with symmetrical square-wave voltage.

The leakage inductances $L_{S1}$, $L_{S2}$ at the transformers $T_a$ and $T_b$ form in each case a resonant circuit with the capacitors $C_1$ and $C_2$. If the resonant frequency thereof is exactly twice as large as the clock frequency, sinusoidal a.c. voltages which are superposed on the d.c. voltage and phase-shifted by 180° result at $C_1$ and $C_2$. These phase-shifted d.c. voltages are compensated by the series circuit of the rectifiers 2a, 2b, whereby a virtually ripple-free d.c. voltage results on the load side.

The resonant operation also ensures that the transistors of the inverters 3a and 3b (MOSFETs in the example shown) are switched on and off in a virtually currentless manner, which reduces losses and substantially avoids HF disturbances. Owing to the moderate range of change of current in the transformer windings, parasitic loss effects (eddy currents, skin and proximity effect or the like) are also reduced.

In the examples shown, it is assumed that the battery voltage is lower than the mains voltage or intermediate circuit voltage. Under this precondition, there are some advantages of the circuit shown. Because the resonance capacitors $C_1$ and $C_2$ are arranged on the side of the higher voltage (i.e. the mains side here), they have lower losses and a higher energy density. Furthermore, the series connection of the two converters on the high voltage side permits the use of switches with lower losses.

The manner in which the coils $L_a$, $L_c$ act on the mains feedback of the converter according to the invention—in particular when they are coupled—is to be explained below.

Figure 12:
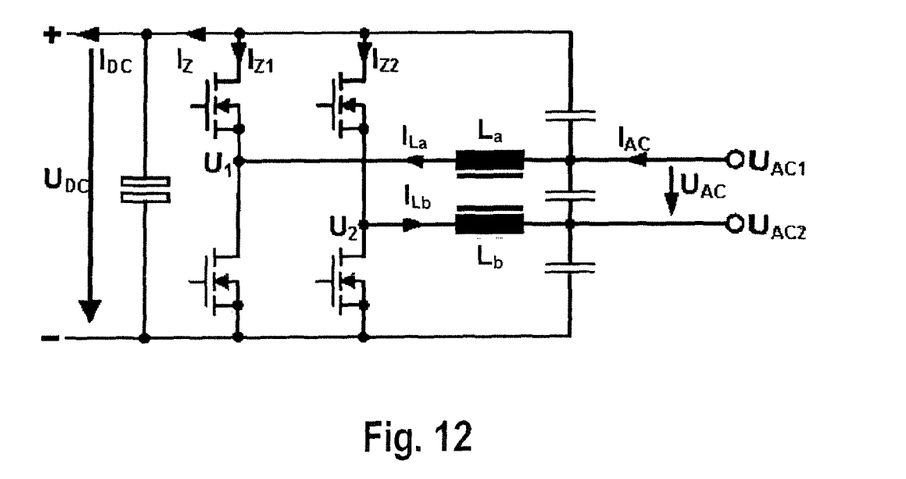
FIG. 12 shows a simplified rectifier having mains-side uncoupled coils.

In FIG. 12, for better presentation and recognizability of the advantages according to the invention, a rectifier for two phases, in this case for the a.c. voltages $U_{AC1}$ and $U_{AC2}$, is shown instead of a three-phase rectifier according to the invention. However, the following considerations also apply to three and more phases. Two coupled coils $L_a$ and $L_b$ are connected on the mains side to the rectifier. The actuation of the transistors of the rectifier is effected with symmetrical pulse-width modulation (PWM), i.e. the ascending and descending flanks of the PWM signals have the same time difference relative to the "clock time" (dashed line in FIGS. 13a and 13b).

Figure 13A:
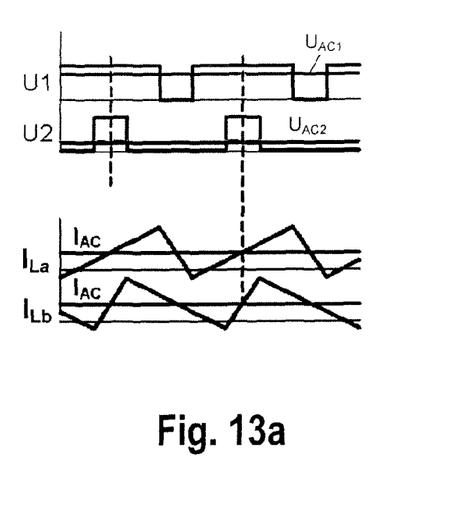
FIG. 13a shows current and voltage curves of the circuit shown in FIG. 12, at 25% duty cycle.
Figure 13B:
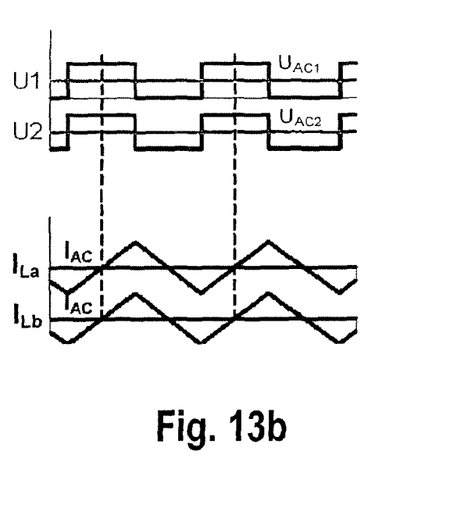
FIG. 13b shows current and voltage curves of the circuit shown in FIG. 12, at 50% duty cycle.

FIGS. 13a and 13b show the variation of the potentials $U_1$ and $U_2$, $U_{AC1}$ and $U_{AC2}$ as a function of time at both connections of the coils $L_a$ and $L_b$, the coil currents $I_{La}$ and $I_{Lb}$ and the mains-side current $I_{AC}$. It should be noted here that the mains-side parameters $U_{AC1}$, $U_{AC2}$ and $I_{AC}$ are shown as being constant owing to the high clock frequency of the rectifier (e.g. 33 kHz) in FIGS. 13a and 13b in comparison with the mains frequency (e.g. 50 Hz). FIG. 13a shows the variations of said parameters as a function of time for 25% duty cycle, and FIG. 13b for 50% duty cycle.

The chokes "integrate" the voltages $U_{AC1}-U_1$ and $U_{AC2}-U_2$, which gives a sawtooth-like or triangular current curve. As is evident from FIGS. 13a and 13b, the coil currents $I_{La}$ and $I_{Lb}$ vary relatively considerably about a mean value, which leads to high ripple currents. As is evident from FIG. 13b, this applies even when the mean current value is equal to zero.

Figure 14:
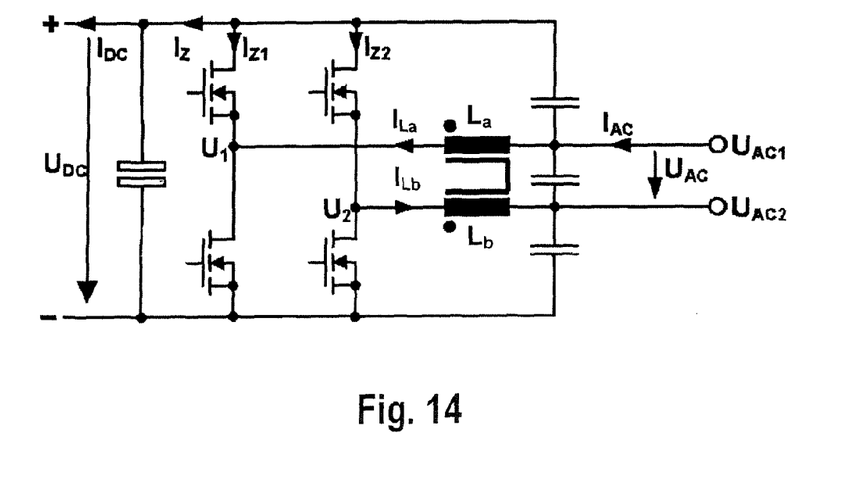
FIG. 14 shows a simplified rectifier having mains-side coupled coils.
Figure 15A:
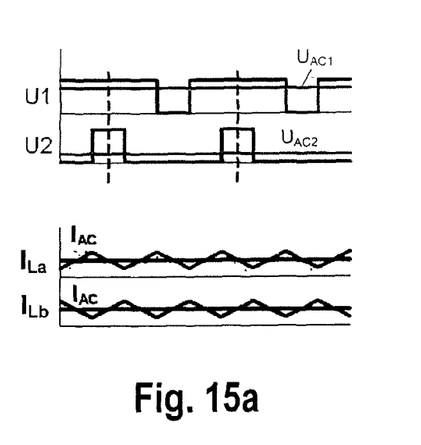
FIG. 15a shows current and voltage curves of the circuit shown in FIG. 14, at 25% duty cycle.
Figure 15B:
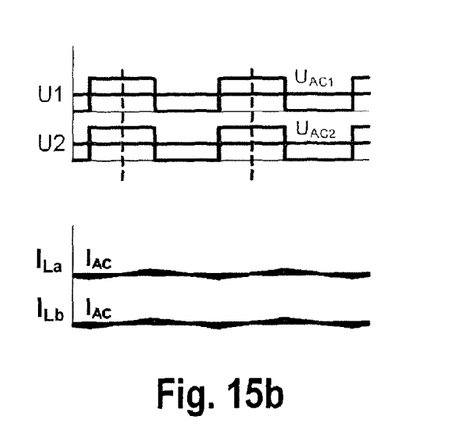
FIG. 15b shows current voltage curves of the circuit shown in FIG. 14, at 50% duty cycle.

FIG. 14 shows a variant of the circuit shown in FIG. 12. Here, the coils $L_a$ and $L_b$ are now coupled. FIGS. 15a and 15b show the variation of various parameters as a function of time, analogously to FIGS. 13a and 13b.

The two coils or chokes $L_a$ and $L_b$ are wound on the same closed core. This results in a very high main inductance. The actual storage chokes result from the leakage inductance. As a result of the high main inductance, there is virtually no current ripple at $U_{AC}=0$ (FIG. 15b). This setup is therefore preferred according to the invention. In the case of width ratios not equal to 50%, only the difference between the voltages $(U_{AC1}-U_1)-(U_{AC2}-U_2)$ is integrated via the leakage inductance. The symmetrical modulation results in twice the ripple current frequency and half the ripple current amplitude in comparison with the "uncoupled" variant in FIG. 12. The current ripple is therefore substantially reduced according to the invention.

List of reference numerals

| | |
|---|---|
| 1a,1c | Converter |
| 2, 2a, 2b | Inverter |
| 3, 3a, 3b | Rectifier |
| 4 | Filter |
| 5a,5c | Battery charger |
| B | Battery |
| C | Capacitor |
| D | Rectifying element/diode |
| FP | Low end |
| $I_{AC}$ | Alternating current |
| $I_C$ | Capacitor current |
| $I_{L1}$,$I_{L3}$ | Phase currents |
| $I_{La}$,$I_{Lb}$ | Coil currents |
| $L_1$ | First phase |
| $L_{2N}$ | Second phase/neutral conductor |
| $L_3$ | Third phase |
| $L_a$ | First coil/choke |
| $L_{a1}$,$L_{a2}$ | Part-coils of the first coil $L_a$ |
| $L_b$ | Second coil/choke |
| $L_c$ | Third coil/choke |
| $L_{S1}$, $L_{S2}$ | Leakage inductances |
| $R_L$ | Load resistance |
| S | Switch |
| $S_C$ | Apparent power at the capacitor C |
| T | Transistor |

-continued

| List of reference numerals | |
|---|---|
| T, $T_a$, $T_b$ | Transformer |
| $U_{AC}$, $U_{AC1}$, $U_{AC2}$ | a.c. voltages |
| $U_C$ | Capacitor voltage |
| $U_{DC}$, $U_{DC1}$, $U_{DC2}$ | d.c. voltages |
| $U_{L1}$.$U_{L3}$ | Phase voltages |

What is claimed is:

1. A converter system for single-phase and three-phase operation comprising:
a converter;
a first mains branch for said converter;
said first mains branch connected at a point between a first set of two rectifying diodes in series;
a first choke coil in said first mains branch, said first choke coil located before said connection point to between said first set of two rectifying diodes;
a second mains branch for said converter;
said second mains branch connected at a second point between a second set of two rectifying diodes in series;
a second choke coil in said second mains branch, said second choke coil located before said connection second point to between said second set of two rectifying diodes;
a third mains branch for said converter;
a switch;
a third choke coil connected to said switch and to a third connection point between a third set of two rectifying diodes;
said switch having a first position that connects said third choke coil to said third mains branch for three-phase current conversion; and,
said switch having for single-phase current conversion a second position that connects said third choke coil to a capacitor, said capacitor also connected to a low end of said converter system.

2. A converter system as claimed in claim 1, further comprising:
a respective switch connected antiparallel to each one of said rectifying diodes.

3. A converter system as claimed in claim 1, further comprising:
a two-pole inverter connected to said low end of said converter and to a high end of said converter;
a transformer primary side connected to said inverter; and,
a transformer secondary side, said transformer secondary side connected to a two-pole rectifier configured for load connection.

4. A converter system for single-phase and three-phase operation comprising:
a converter;
a first mains branch for said converter;
said first mains branch connected at a point between a first set of two rectifying diodes in series;
a first choke coil in said first mains branch, said first choke coil located before said connection point to between said first set of two rectifying diodes;
a second mains branch for said converter;
said second mains branch connected at a second point between a second set of two rectifying diodes in series;
a second choke coil in said second mains branch, said second choke coil located before said connection second point to between said second set of two rectifying diodes;
a third mains branch for said converter;
a switch;
a third choke coil connected to said switch and to a third connection point between a third set of two rectifying diodes;
said switch having a first position that connects said third choke coil to said third mains branch for three-phase current conversion; and,
said switch having for single-phase current conversion a second position that connects said third choke coil to a capacitor, said capacitor also connected to said second mains branch.

5. A converter system as claimed in claim 4, further comprising:
a respective switch connected antiparallel to each one of said rectifying diodes.

6. A converter system as claimed in claim 4, further comprising:
a two-pole inverter connected to said low end of said converter and to a high end of said converter;
a transformer primary side connected to said inverter; and,
a transformer secondary side, said transformer secondary side connected to a two-pole rectifier configured for load connection.

7. A converter system for single-phase and three-phase operation comprising:
a converter;
a first mains branch for said converter;
said first mains branch connected at a point between a first set of two rectifying diodes in series;
a first choke coil in said first mains branch, said first choke coil located before said connection point to between said first set of two rectifying diodes;
a second mains branch for said converter;
said second mains branch connected at a second point between a second set of two rectifying diodes in series;
a second choke coil in said second mains branch, said second choke coil located before said connection second point to between said second set of two rectifying diodes;
a third mains branch for said converter;
two part-coils for said third mains branch;
a switch for said two part-coils of said third mains branch, said switch having a first position connecting said part-coils in parallel sense to said third mains branch for three-phase conversion operation, said first position also connecting said part-coils in parallel to a third point between a third set of two rectifying diodes in series; and,
said switch having for single-phase operation a second position disconnecting said two part-coils from said third mains branch and connecting said two part-coils in series between said third point located between said third set of diodes and a capacitor connected to a low end of said converter.

8. A converter system as claimed in claim 7, further comprising:
a respective switch connected antiparallel to each one of said rectifying diodes.

9. The converter system as claimed in claim 7 wherein:
said two part-coils are coupled in the same sense with said first and second choke coils during three-phase operation, and during single-phase operation one of said part-coils is coupled in the same sense as said first and second choke coils while the second of said part-coils is coupled in the opposite sense to said first and second choke coils.

10. The converter system as claimed in claim 7 wherein:
said two part-coils each have the same number of turns as said first and second choke coils.

11. A converter system as claimed in claim 7, further comprising:
a first two-pole inverter connected to said converter;
a primary side of a first transformer connected to said first two-pole inverter;
a first two-pole rectifier, said first two-pole rectifier connected to a secondary side of said first transformer;
a second two-pole inverter connected to said converter;
a primary side of a second transformer connected to said second two-pole inverter; and,
a second two-pole rectifier, said second two-pole rectifier connected to a secondary side of said second transformer.

12. A converter system as claimed in claim 11, further comprising:
a first inverter capacitor connected in parallel to said first two-pole inverter; and,
a second inverter capacitor connected in parallel to said second two-pole inverter.

13. A converter system as claimed in claim 11, further comprising:
a first rectifier capacitor connected in parallel to said first two-pole rectifier; and,
a second rectifier capacitor connected in parallel to said second two-pole rectifier.

14. The converter system as claimed in claim 11 wherein:
said first and second two-pole inverters are connected in parallel to said converter.

15. The converter system as claimed in claim 11 wherein:
said first and second two-pole inverters are connected in series to said converter.

16. The converter system as claimed in claim 11 wherein:
said rectifiers are connected in series.

17. The converter system as claimed in claim 11 wherein:
said rectifiers are connected in parallel.

18. A converter system as claimed in claim 11, further comprising:
a plurality of switches in said first and second inverters; and,
antiparallel-connected rectifying diodes, respectively, for each one of said plurality of switches.

19. A converter system as claimed in claim 11, further comprising:
a plurality of rectifier-incorporated rectifying diodes in said first and second rectifiers; and,
antiparallel-connected switches, respectively, for each one of said rectifier-incorporated rectifying diodes.

20. A converter system as claimed in claim 7, further comprising:
a first capacitor connected in parallel to said first set of two rectifying diodes;
a second capacitor connected in parallel to said second set of two rectifying diodes; and,
a third capacitor connected in parallel to said third set of two rectifying diodes.

* * * * *